(12) United States Patent
Okuda et al.

(10) Patent No.: US 7,613,073 B2
(45) Date of Patent: Nov. 3, 2009

(54) ULTRASONIC SENSOR

(75) Inventors: Yasuyuki Okuda, Aichi-gun (JP);
Takahiko Yoshida, Okazaki (JP);
Makiko Sugiura, Hekinan (JP);
Ryounosuke Tera, Toyota (JP); Yuuta Hasebe, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/797,205

(22) Filed: May 1, 2007

(65) Prior Publication Data
US 2007/0268783 A1    Nov. 22, 2007

(30) Foreign Application Priority Data
May 8, 2006    (JP)    ............... 2006-129109

(51) Int. Cl.
*G01S 15/00*    (2006.01)
*G01H 11/00*    (2006.01)

(52) U.S. Cl. ............... 367/99; 73/628; 73/649

(58) Field of Classification Search .......... 367/99; 73/627, 628, 649, 629
See application file for complete search history.

(56) References Cited

U.S. PATENT DOCUMENTS

| | | | | |
|---|---|---|---|---|
| 3,046,544 A | * | 7/1962 | Auer Jr. et al. | 367/151 |
| 4,581,685 A | * | 4/1986 | Kago et al. | 367/140 |
| 4,636,997 A | * | 1/1987 | Toyama et al. | 367/140 |
| 4,967,860 A | | 11/1990 | Kremser | |
| 5,059,946 A | * | 10/1991 | Hollowbush | 367/140 |
| 5,956,292 A | | 9/1999 | Bernstein | |
| 7,293,462 B2 | * | 11/2007 | Lee et al. | 73/649 |

FOREIGN PATENT DOCUMENTS

| | | |
|---|---|---|
| JP | A-61-205098 | 9/1986 |
| JP | A-10-123236 | 5/1998 |
| JP | A-10-138852 | 5/1998 |
| JP | A-2001-141807 | 5/2001 |
| JP | A-2002-058097 | 2/2002 |
| JP | A-2007-255924 | 10/2007 |

OTHER PUBLICATIONS

Office Action dated Dec. 19, 2008 in corresponding Chinese Patent Application No. 200710100976.6 (and English translation).

* cited by examiner

*Primary Examiner*—Ian J Lobo
(74) *Attorney, Agent, or Firm*—Posz Law Group, PLC

(57) ABSTRACT

An ultrasonic sensor includes a plurality of vibrating parts, a plurality of receiving elements, and a waveguide. Each of the vibrating parts vibrates when a corresponding ultrasonic wave reflected by a detection object is transmitted thereto, and receives the ultrasonic wave. Each of the elements includes corresponding one of the vibrating parts and detects the object using the corresponding ultrasonic wave. The ultrasonic wave is transmitted through the waveguide to each of the elements. The waveguide includes a first opening facing the object, a second opening, and a reflecting surface that reflects the ultrasonic wave in a direction to each of the vibrating parts. The ultrasonic wave enters through the first opening. The second opening is not viewable from the first opening. The second opening holds the elements such that the each of the vibrating parts faces a direction where the each of the vibrating parts receives the ultrasonic wave.

13 Claims, 7 Drawing Sheets

ULTRASONIC SENSOR

CROSS REFERENCE TO RELATED APPLICATION

This application is based on and incorporates herein by reference Japanese Patent Application No. 2006-129109 filed on May 8, 2006.

BACKGROUND OF THE INVENTION

1. Field of the Invention

The present invention relates to an ultrasonic sensor.

2. Description of Related Art

Lately, an ultrasonic sensor of this kind is installed in, for example, an automobile (vehicle). The ultrasonic sensor transmits an ultrasonic wave from a transmitting device, and receives the ultrasonic wave, which is reflected by a detection object, using a receiving device, and thereby measures a direction of the object around the automobile and a distance to the object. In this manner, by monitoring a surrounding area of the automobile using the ultrasonic sensor, technical development to promote driving safety is taking place.

For example, the ultrasonic sensor is installed in a rear part of the automobile. An automatic parking assistance system, which assists a driver in parking the automobile by backing it with a collision with a human or obstruction being avoided by employing a back sonar for receiving the ultrasonic wave reflected by the human or obstruction behind the automobile using the ultrasonic sensor and for detecting them, is in practical use.

Furthermore, attention is focused on a receiving element of the ultrasonic sensor. The receiving element has a vibrating part including a piezoelectric substance thin film is formed on a thin film part, which is formed as a thin wall part of a substrate using a MEMS (Micro Electro Mechanical System) technology.

When the receiving element of the ultrasonic sensor is installed in the vehicle with the receiving element exposed to an outside, the distance to the detection object cannot be measured accurately if a water droplet or dirt is attached on a surface of the receiving element. As well, the receiving element may be ruined by a load of external force such as a collision with a pebble.

The ultrasonic sensor, which has a protective structure to prevent destruction due to pollution of the receiving element or the load of the external force, is disclosed in, for example, JP2002-58097A. The receiving element is placed in an aluminum case not to expose the receiving element to the outside, and a piezoelectric vibration detecting element for detecting the ultrasonic wave is attached directly to a waveguide-cum-vibrating plate. Accordingly, the ultrasonic sensor receives the ultrasonic wave using the vibration of the waveguide.

However, in the ultrasonic sensor (e.g., piezoelectric or capacitive ultrasonic sensor) that employs the MEMS receiving element, which has the vibrating part to detect the ultrasonic wave using the vibration of the vibrating part, sufficient vibration cannot be obtained by attaching the receiving element directly to a metal case. Furthermore, in the ultrasonic sensor, in which the MEMS receiving element is employed, the receiving element has the piezoelectric substance thin film of low mechanical strength because of its structure. Therefore, when the receiving element is attached directly to the metal case, the receiving element is easy to be damaged.

When the receiving element is not attached to the metal case, and a space is provided between the receiving element and the metal case, the ultrasonic wave cannot be effectively received.

SUMMARY OF THE INVENTION

The present invention addresses the above disadvantages. Thus, it is an objective of the present invention to realize an ultrasonic sensor, which receives an ultrasonic wave effectively, and protects a receiving element.

To achieve the objective of the present invention, there is provided an ultrasonic sensor including a plurality of vibrating parts, a plurality of receiving elements, and a waveguide. Each of the plurality of vibrating parts vibrates when a corresponding ultrasonic wave, which is reflected by a detection object, is transmitted thereto, and thereby receives the corresponding ultrasonic wave. Each of the plurality of receiving elements includes corresponding one of the plurality of vibrating parts and detects the detection object based on the corresponding ultrasonic wave. The waveguide holds the plurality of receiving elements and is formed such that the corresponding ultrasonic wave is transmitted through the waveguide to each of the plurality of receiving elements. The waveguide includes a first opening, a second opening, and a reflecting surface. The first opening faces the detection object. The corresponding ultrasonic wave reflected by the detection object enters through the first opening into the waveguide. The second opening is not viewable from the first opening. The plurality of receiving elements is held by the second opening of the waveguide such that each of the plurality of vibrating parts is arranged to face a direction in which the each of the plurality of vibrating parts receives the corresponding ultrasonic wave. The reflecting surface is for reflecting the corresponding ultrasonic wave, which enters through the first opening of the waveguide, in a direction to the each of the plurality of vibrating parts.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of a waveguide of an ultrasonic sensor according to the present invention is described with reference to drawings. Here, the ultrasonic sensor is installed in a vehicle, and used as an obstacle sensor.

Figure 1A:
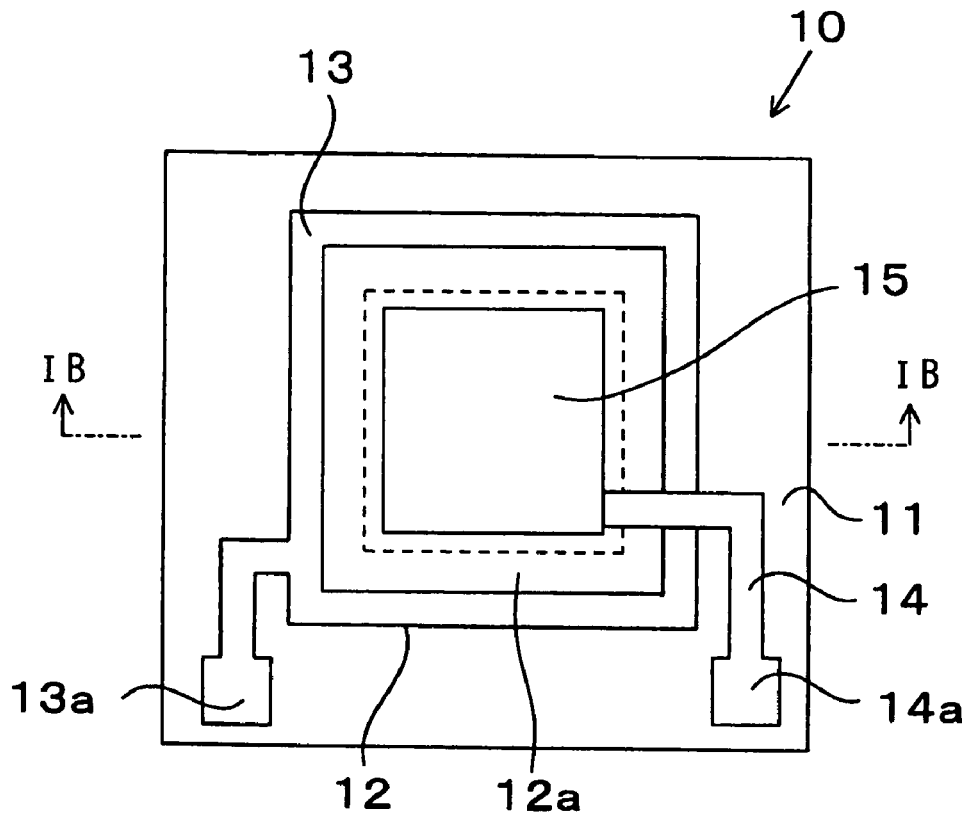
FIG. 1A is a schematic plan view of a receiving element of an ultrasonic sensor.
Figure 1B:
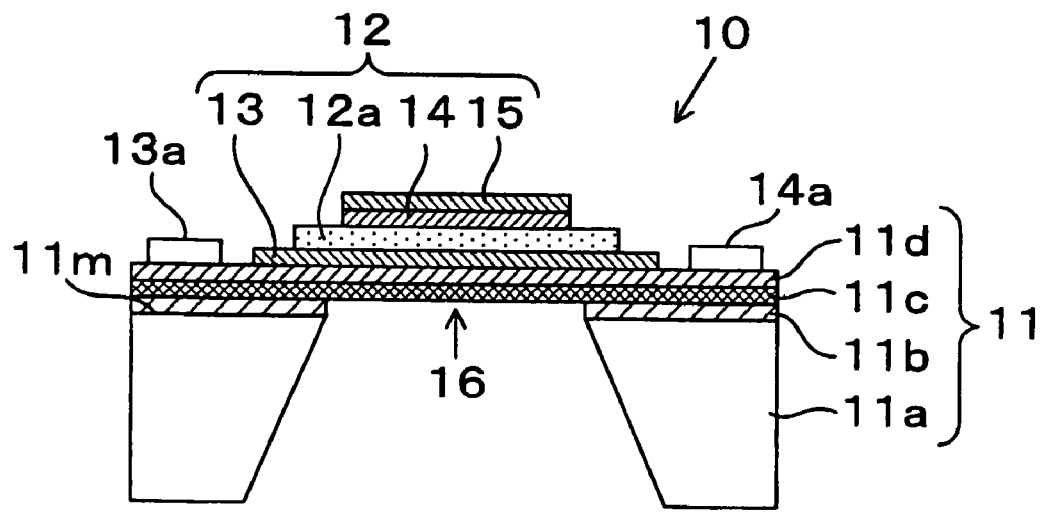
FIG. 1B is a schematic cross-sectional view of FIG. 1A along a line IB-IB.
Figure 2A:
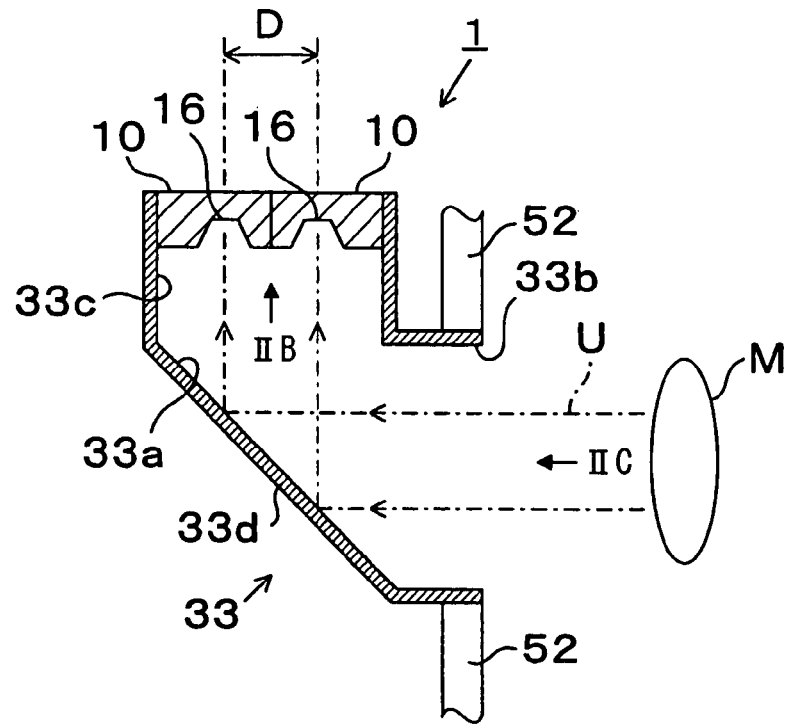
FIG. 2A is an illustrative longitudinal-sectional view of an ultrasonic sensor according to an embodiment of the present invention.
Figure 2B:
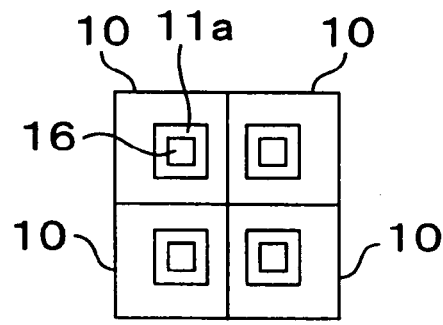
FIG. 2B is an illustrative plan view of FIG. 2A viewed from a direction IIB according to the embodiment.
Figure 2C:
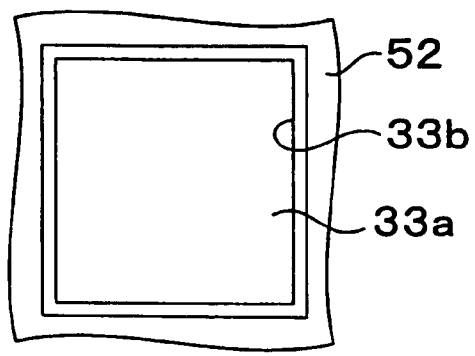
FIG. 2C is an illustrative plan view of FIG. 2A viewed from a direction IIC according to the embodiment.
Figure 3:
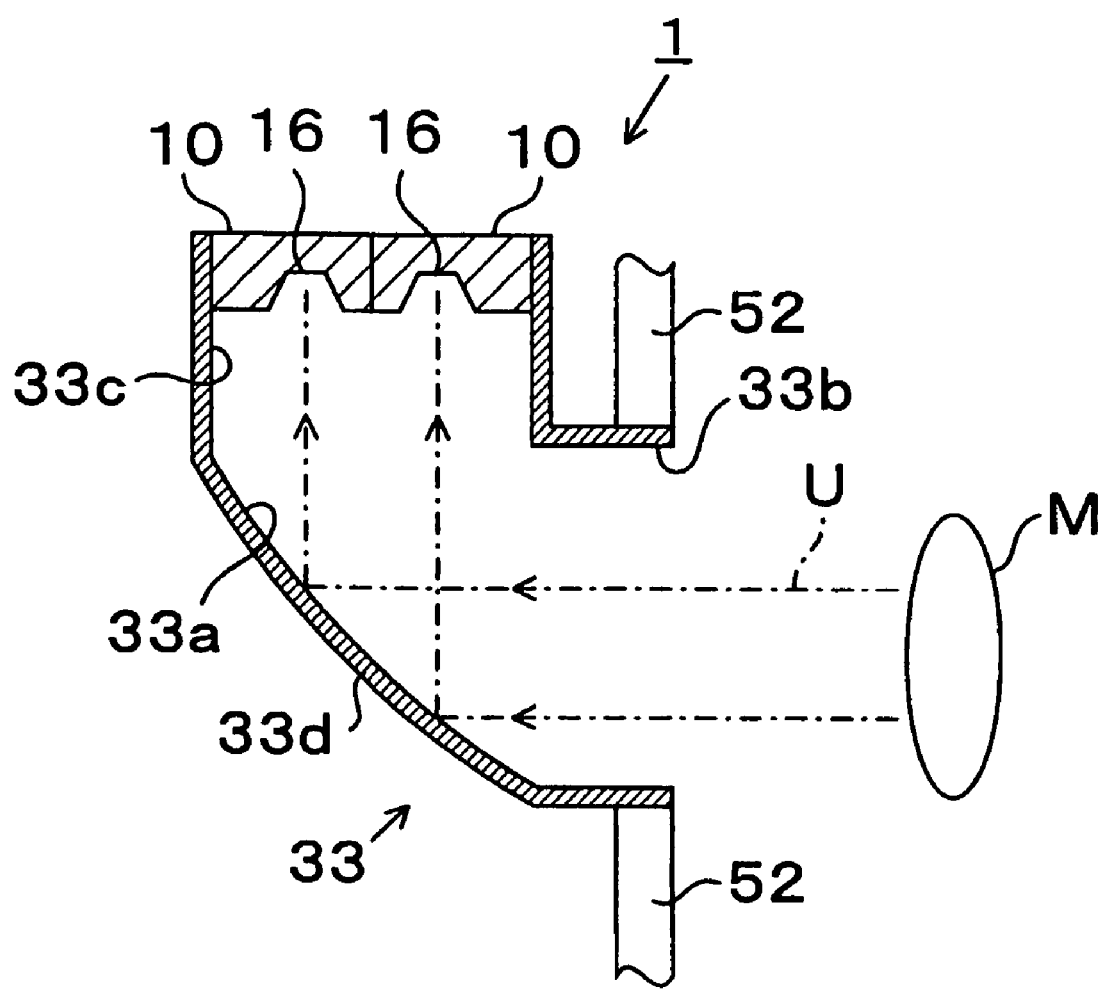
FIG. 3 is an illustrative longitudinal-sectional view showing a modification to a reflecting surface according to a first modification to the embodiment.
Figure 4A:
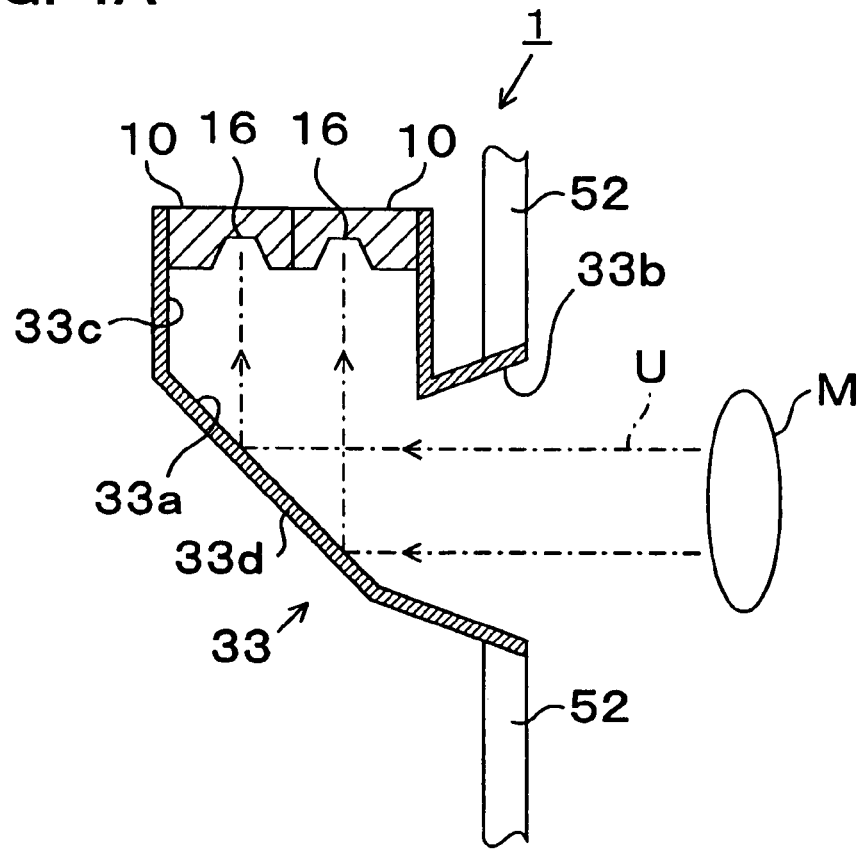
FIG. 4A is an illustrative longitudinal-sectional view showing a modification to a first opening according to a second modification to the embodiment.
Figure 4B:
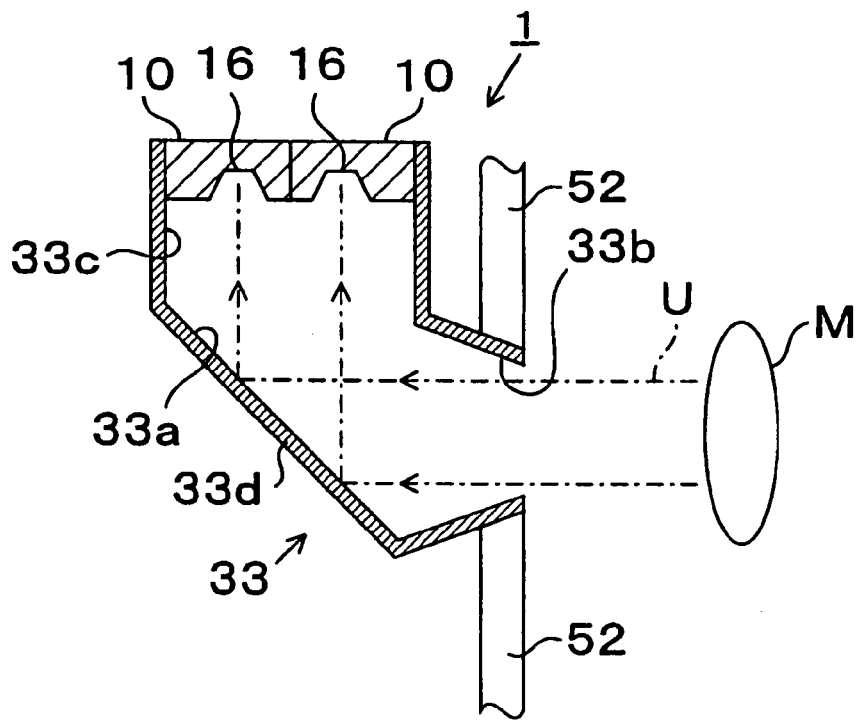
FIG. 4B is an illustrative longitudinal-sectional view showing another modification to the first opening according to the second modification.
Figure 5:
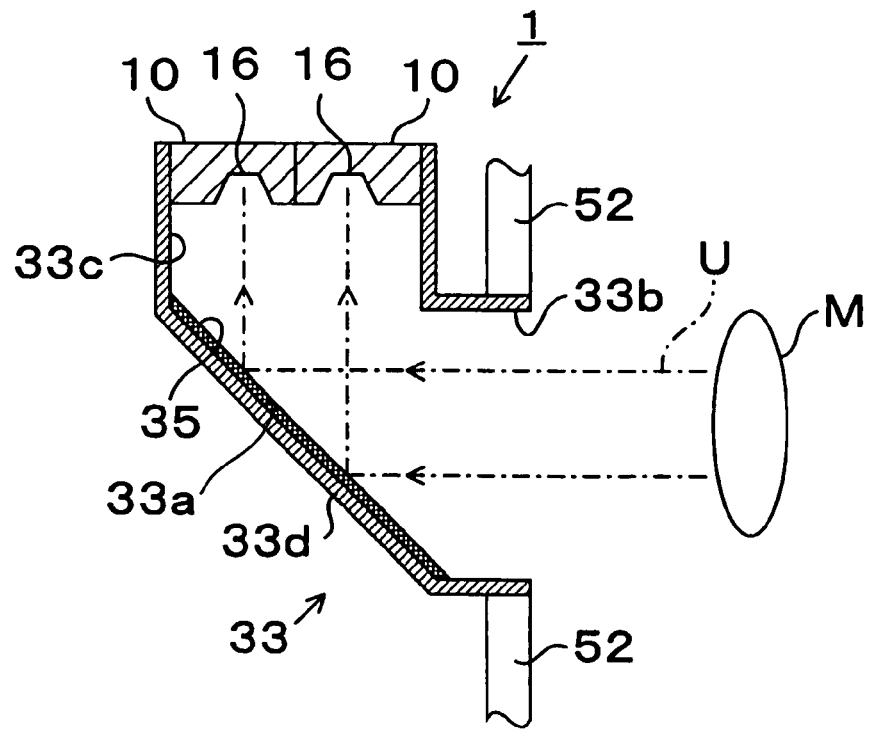
FIG. 5 is an illustrative longitudinal-sectional view of an ultrasonic sensor having a reflecting member that reflects an ultrasonic wave on the reflecting surface according to a third modification to the embodiment.
Figure 6:
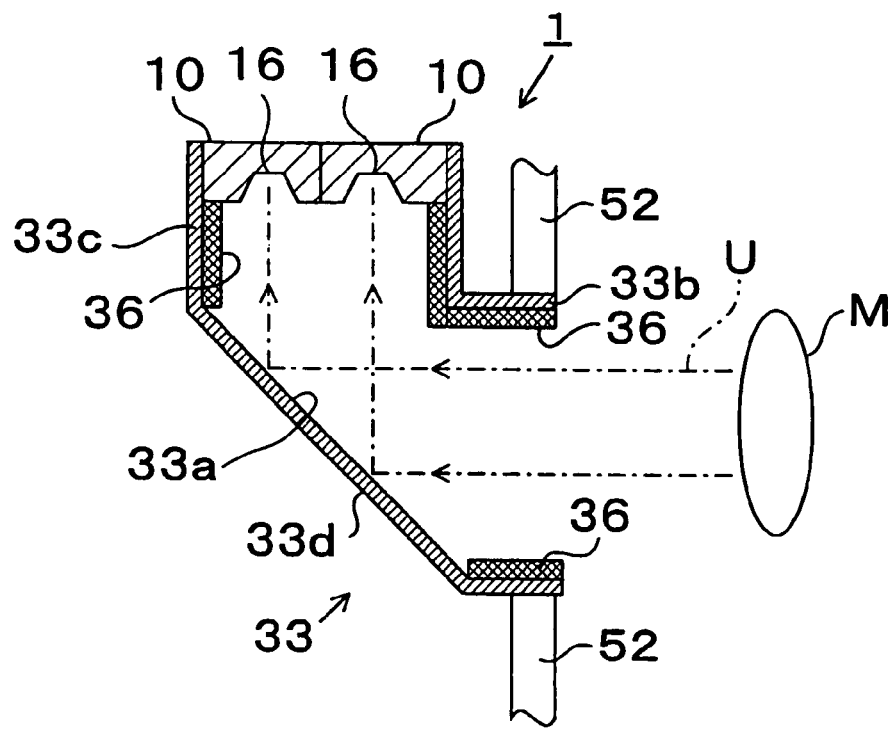
FIG. 6 is an illustrative longitudinal-sectional view of an ultrasonic sensor, in which an absorbing member is provided on an inner wall surface of a waveguide except the reflecting surface according to a fourth modification to the embodiment.
Figure 7A:
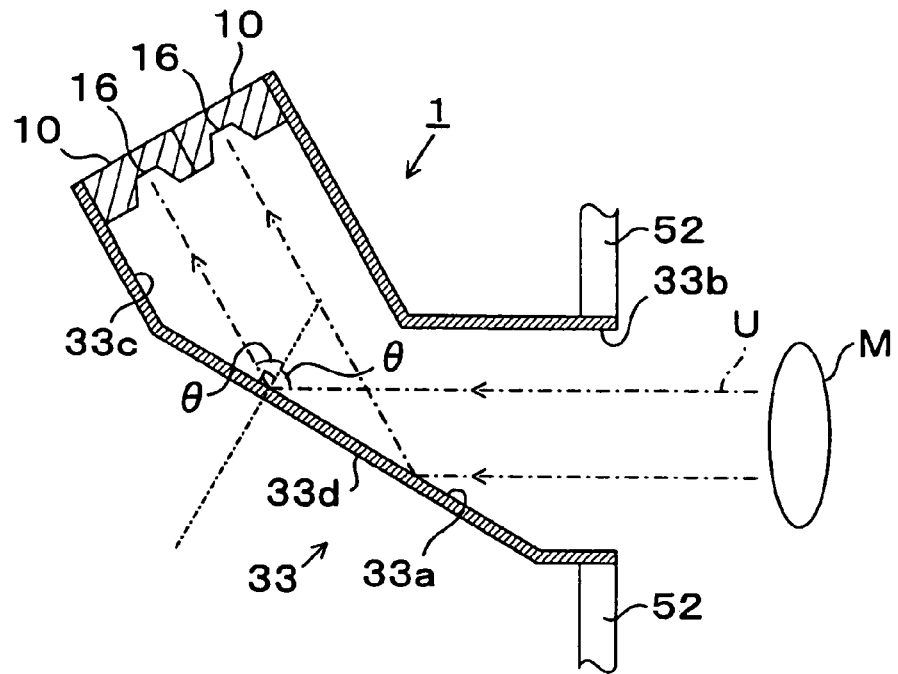
FIG. 7A is an illustrative longitudinal-sectional view showing a modification to arrangements of the first opening, a second opening, and the reflecting surface according to a fifth modification to the embodiment.
Figure 7B:
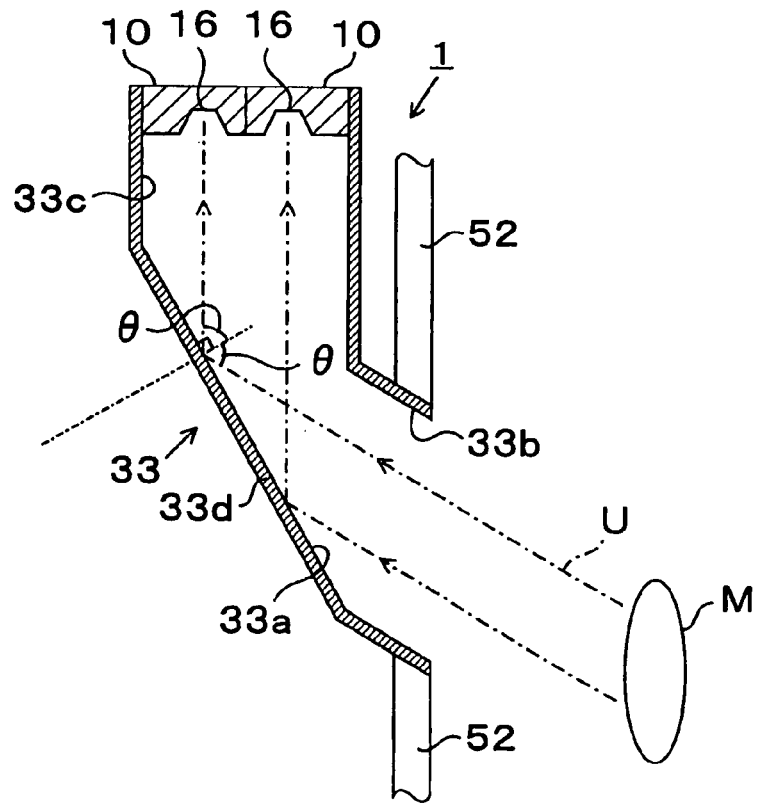
FIG. 7B is an illustrative longitudinal-sectional view showing another modification to the arrangements of the first opening, the second opening, and the reflecting surface according to the fifth modification.

FIGS. 1A, 1B are schematic views of a receiving element of the ultrasonic sensor. FIG. 1A is a schematic plan view of the receiving element. FIG. 1B is a schematic cross-sectional view of FIG. 1A along a line IB-IB. FIGS. 2A, 2B, 2C are illustrative views of an ultrasonic sensor according to the embodiment of the present invention. FIG. 2A is an illustrative longitudinal-sectional view of the ultrasonic sensor. FIG. 2B is an illustrative plan view of FIG. 2A viewed from a direction IIB. FIG. 2C is an illustrative plan view of FIG. 2A viewed from a direction IIC. A right-hand side of FIG. 2A shows an outside of the vehicle. FIG. 3 is an illustrative longitudinal-sectional view showing a modification to a reflecting surface. FIGS. 4A, 4B are illustrative longitudinal-sectional views showing modifications to a first opening. FIG. 5 is an illustrative longitudinal-sectional view of an ultrasonic sensor having a reflecting member that reflects an ultrasonic wave on its reflecting surface. FIG. 6 is an illustrative longitudinal-sectional view of an ultrasonic sensor, in which an absorbing member is provided on an inner wall surface of a waveguide except the reflecting surface. FIGS. 7A, 7B are illustrative longitudinal-sectional views showing modifications to arrangements of the first opening, a second opening, and the reflecting surface.

In addition, each drawing is partly enlarged for the purpose of explanation. A structure of the receiving element is simplified except for FIGS. 1A, 1B.

(Structure of Receiving Element of Ultrasonic Wave)

The structure of the receiving element provided in the ultrasonic sensor is described below.

As shown in FIGS. 1A, 1B, a receiving element 10 is formed using a quadrangular semiconductor substrate 11 having SOI (Silicon On Insulator) structure. The semiconductor substrate 11 is formed by stacking a first dielectric layer 11b, a silicon active layer 11c, and a second dielectric layer 11d in this order on an upper surface 11m of a supporting member 11a, which is made of silicon.

At a central part of the semiconductor substrate 11, central parts of the supporting member 11a and the first dielectric layer 11b are removed in a quadrangular manner using a MEMS technology. Accordingly, the supporting member 11a is formed in a frame-like manner, with a hole of a quadrangular prism being bored in its central part. The rest of the semiconductor substrate 11, that is, the silicon active layer 11c and the second dielectric layer 11d are formed in a quadrangular filmy manner, respectively.

A piezoelectric vibrator 12 is formed on the second dielectric layer 11d, covering a part of the second dielectric layer 11d, which is formed in a filmy manner. The piezoelectric vibrator 12 is formed by placing a piezoelectric substance thin film 12a, which is made of, for example, lead zirconate titanate (PZT), between a lower surface electrode 13 and an upper surface electrode 14. The lower surface electrode 13 and the upper surface electrode 14 have respective parts formed in a quadrangular manner to put the piezoelectric substance thin film 12a therebetween, and respective electrode pads 13a, 14a formed near corners of the semiconductor substrate 11 to take out a potential.

Further, a third dielectric layer 15 is formed on a surface of the upper surface electrode 14. A vibrating part 16 is formed from a part, in which the silicon active layer 11c, the second dielectric layer 11d, the piezoelectric substance thin film 12a, the lower surface electrode 13, the upper surface electrode 14, and the third dielectric layer 15 are stacked, and which corresponds to a frame-like opening of the supporting member 11a. An end part of the vibrating part 16 is held by the supporting member 11a.

The vibrating part 16 has a predetermined resonance frequency. The vibrating part 16 receives the ultrasonic wave, which is reflected by a detection object and transmitted to the receiving element 10, and produces resonance. By converting displacement of the vibrating part 16, which is caused by the resonance, into a voltage signal using the piezoelectric vibrator 12, to detect the ultrasonic wave.

The vibrating part 16 of the receiving element 10, which is produced using the MEMS technology, is held by the supporting member 11a. Hence, an area, which restricts vibration in contact with the vibrating part 16, is small. Accordingly, the displacement of the vibrating part 16 can be made large to improve a receiver sensitivity of the vibration. Therefore, the receiving element 10 is well suited as a receiving element because of an increased receiver sensitivity of the ultrasonic wave.

(Structure of Ultrasonic Sensor)

As shown in FIG. 2A, a waveguide 33, which transmits the ultrasonic wave to the receiving element 10, is formed by bending a tubular component having a quadrangular longitudinal section at an approximately right angle. The waveguide 33 has an opening on an obstruction M (detection object) side, and includes a first opening 33b, a second opening 33c, and a reflecting surface 33a. An ultrasonic wave U reflected by the obstruction M enters through the first opening 33b. The second opening 33c is disposed in a position, which cannot be viewed from the first opening 33b. A plurality of the vibrating parts 16 of the receiving elements 10 is arranged at the second opening 33c facing a direction in which the ultrasonic wave U is received. The reflecting surface 33a reflects the ultrasonic wave U that enters through the first opening 33b toward the receiving element 10.

The waveguide 33 is attached to an attaching portion formed by penetrating through a body 52 immediately below a bumper with an end part of the first opening 33b exposed to the outside of the vehicle, such that the first opening 33b is perpendicular to an outer surface of the body 52.

As shown in FIG. 2B, in an ultrasonic sensor 1 of the present embodiment, the four receiving elements 10 are arranged at the second opening 33c in array with two adjacent elements being parallel to the other two in lengthwise and lateral directions. Each vibrating part 16 is attached such that it is generally perpendicular to the direction in which the ultrasonic wave U is received. A distance between two central parts of the vibrating parts 16 of the receiving elements 10 adjacent to each other is equal to an integral multiple of half-wave length of the ultrasonic wave U.

The reflecting surface 33a is formed on an inner wall surface of a bend part 33d making a 45° angle with a direction in which the ultrasonic wave U enters. As shown in FIG. 2C, the reflecting surface 33a can only be viewed from the first opening 33b, and the second opening 33c cannot be viewed from the first opening 33b.

The waveguide 33 is a structural member, which holds the receiving elements 10. The waveguide 33 may be preferably made of a hard material to improve reflection efficiency of the ultrasonic wave U on the reflecting surface 33a. Accordingly, the waveguide 33 may be preferably made of various metallic materials such as stainless steel and aluminum alloy. In addition, synthetic resin of various kinds, glass, or ceramics may be used.

A sound pressure of the ultrasonic wave is proportional to a cross-sectional area of its transmission path. Thus, an opening area of the first opening 33b may preferably be equal to or larger than an area of the vibrating part 16 in order to receive the ultrasonic wave that has sufficient signal strength.

(Transmission of Ultrasonic Wave)

The ultrasonic wave U, which is transmitted by a transmitting element 20 (FIGS. 8A, 8B) and reflected by the obstruction M, enters through the first opening 33b into the waveguide 33, and is reflected by the reflecting surface 33a. After that, the ultrasonic wave U reaches the receiving element 10 corresponding to a position at the first opening 33b, through which the ultrasonic wave U enters, and is detected by the vibrating part 16.

For example, as shown in FIG. 2A, the ultrasonic wave U (indicated by an upper and left-hand one of two dashed-dotted lines with arrows), which enters through the first opening 33b from a position on an upper side of FIG. 2A, is reflected by an upper left part of the reflecting surface 33a to be detected by the receiving element 10 arranged on a left-hand side of FIG. 2A. As well, the ultrasonic wave U (indicated by a lower and right-hand one of the two dashed-dotted lines with arrows), which enters through the first opening 33b from a position on a lower side of FIG. 2A, is reflected by a lower right part of the reflecting surface 33a to be detected by the receiving element 10 arranged on a right-hand side of FIG. 2A.

When the vibration of the ultrasonic wave is transmitted to the vibrating part 16 and the vibrating part 16 vibrates, the voltage signal is outputted from the piezoelectric vibrator 12 (FIGS. 1A, 1B) to a circuit element (not shown).

Then, the above circuit converts the voltage signal outputted from the piezoelectric vibrator 12 into a processible signal in an ECU, to be outputted to the ECU. The ECU performs predetermined processing based on the inputted signal.

Using the plurality of the receiving elements 10 as described above, by obtaining a time difference and a phase difference of the ultrasonic wave received by each receiving element 10, not only a distance to the obstruction M but a position of the obstruction M can be measured based on each of the differences.

Moreover, the waveguide 33 is not necessary for each of the plurality of the receiving elements 10, and they can be brought together in one waveguide 33. Consequently, the waveguide 33 can be downsized, and thereby the ultrasonic sensor 1 can be downsized.

In the present embodiment, a distance D between two central parts of the vibrating parts 16 of the receiving elements 10 adjacent to each other is equal to the integral multiple of the half-wave length of the ultrasonic wave U. As a result, the time difference can be detected based on the phase difference of the received ultrasonic wave. Hence, the time difference of the received ultrasonic wave can be detected accurately.

Therefore, measurement accuracy of the distance to the obstruction M and the position of the obstruction M can be improved.

In the ultrasonic sensor 1 having the above structure, the ultrasonic wave U, which is reflected by the obstruction M and enters through the first opening 33b into the waveguide 33, is reflected by the reflecting surface 33a in directions to the plurality of the receiving elements 10. Accordingly, the ultrasonic wave U is transmitted directly to each receiving element 10 through a medium of air without any other intermediary members, and thereby damping of the ultrasonic wave can be reduced. As well, the damping of the ultrasonic wave U due to multiple reflections and the like inside the waveguide 33 can be reduced as compared to a case where the reflecting surface 33a is not formed, so that sensitivity of the ultrasonic sensor 1 can be improved.

Besides, the ultrasonic wave U reflected by the reflecting surface 33a is transmitted directly to the vibrating parts 16, and thereby the displacement of the vibrating part 16 can be made large. Thus, a detection signal by the receiving element 10 is made strong, thereby improving the sensitivity of the ultrasonic sensor 1.

Furthermore, the second opening 33c cannot be viewed from the first opening 33b. Accordingly, even when a foreign object such as a pebble, and a water droplet are blown toward the waveguide 33 and enter through the first opening 33b into the waveguide 33, for example, there is very little possibility for them to collide directly with the receiving element 10, and thus the receiving element 10 can be protected.

That is, the ultrasonic sensor 1, which receives the ultrasonic wave U effectively and in which the receiving element 10 is protected, can be realized.

The number of receiving elements 10 is for an illustrative purpose, and is not limited to four. As regards their arrangement, two receiving elements 10 are not necessarily arranged in the lengthwise and lateral directions. Alternatively, a chip integrally-molded from the plurality of the receiving elements 10 may be employed.

Various forms of sensors may be employed as the receiving element 10. For example, a capacitive vibration detection element, which detects the ultrasonic wave using variation of an interelectrode capacity, may be employed.

An element that can transmit and receive may be employed instead of the receiving element 10.

The waveguide 33 is not necessarily tubular with a quadrangular cross-sectional surface, and may have a cylindrical shape, for example.

Additionally, by varying a shape or angle of the reflecting surface 33a to adjust a direction in which the ultrasonic wave U is reflected, intervals at which the receiving elements 10 are arranged may be changed.

(First Modification)

The reflecting surface 33a is not limited to a planar surface, and may be formed like a curved surface as long as it can reflect the ultrasonic wave, which enters through the first opening 33b, toward the receiving element 10. For example, the reflecting surface 33a may be formed in an arc-like manner as shown in FIG. 3.

(Second Modification)

As shown in FIG. 4A, the first opening 33b may be formed such that its cross-sectional area gradually increases as it extends from an inside of the waveguide 33 to its end part on an obstruction M side. By using this configuration, sound collecting can be performed on the ultrasonic wave U at the first opening 33b, and the sound pressure of the ultrasonic wave U can be made high. Consequently, the sensitivity of the ultrasonic sensor 1 can be improved.

As shown in FIG. 4B, the first opening 33b may be formed such that its cross-sectional area gradually decreases as it extends from the inside of the waveguide 33 to its end part on the obstruction M side. By using this configuration, a cross-sectional area of the waveguide 33 is increased, and the ultrasonic wave is transmitted efficiently. Also, the first opening 33b becomes narrower, and thereby an entry of the foreign object blown from the outside of the vehicle into the waveguide 33 can be reduced.

When the ultrasonic sensor 1 has the transmitting element 20 that can transmit the ultrasonic wave, the sound collecting can be performed on the ultrasonic wave at the first opening 33b in transmitting the ultrasonic wave, thereby making high the sound pressure of the transmitted ultrasonic wave.

(Third Modification)

As shown in FIG. 5, a reflecting member 35 having higher reflectivity of the ultrasonic wave than the inner wall surface of the waveguide 33 may be formed on the reflecting surface 33a by applying a plating to the reflecting surface 33a, for example. By using this configuration, the reflection efficiency of the ultrasonic wave on the reflecting surface is improved, and thus sensitivity of the receiving element 10 can be further improved.

In addition, the reflecting member 35 may be formed by attaching hard materials such as a metal plate, glass, and ceramics on the reflecting surface 33a.

(Fourth Modification)

As shown in FIG. 6, an absorbing member 36, which is formed from a material having a higher absorption coefficient of the ultrasonic wave than the reflecting surface 33a, may be formed on the inner wall surface of the waveguide 33 except the reflecting surface 33a. The absorbing member 36 may be formed out of a sponge material, rubber, or resin, for example.

By using this configuration, the ultrasonic wave, which is reflected by the inner wall surface of the waveguide 33 to become noise, can be reduced. As a result, the sensitivity of the receiving element 10 can be further improved.

Besides, a known geometric sound absorbing structure, which is used in an anechoic room and the like, may be employed.

When the absorbing member 36, the absorption coefficient of which is equal to or larger than 70%, is used, the noise can be effectively reduced. Additionally, the absorbing member 36 may be used in combination with the reflecting member 35.

(Fifth Modification)

Arrangements of the first opening 33b, the second opening 33c, and the reflecting surface 33a can be designed without restriction, provided that the second opening 33c cannot be viewed from the first opening 33b, and that the reflecting surface 33a can reflect the ultrasonic wave U, which enters through the first opening 33b, toward the receiving element 10. For example, as shown in FIG. 7A, the reflecting surface 33a may be arranged such that an entry angle θ of the ultrasonic wave U relative to the reflecting surface 33a is larger than 45°, and the second opening 33c may be formed along the direction in which the ultrasonic wave U is reflected by the reflecting surface 33a.

Moreover, as shown in FIG. 7B, the waveguide 33 having the arrangements shown in FIG. 7A may be attached to the attaching portion of the body 52 at a slant relative to the outer surface of the body 52. By using this configuration, a direction in which the ultrasonic sensor 1 detects the obstruction M can be varied.

(Sixth Modification)

Figure 8A:
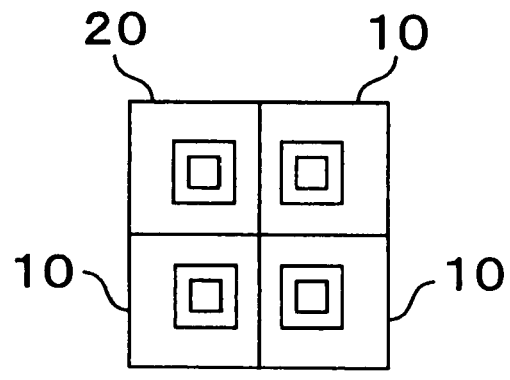
FIG. 8A is an illustrative plan view of FIG. 2A viewed from the direction IIB, in which one of the receiving elements is replaced with a transmitting element according to a sixth modification to the embodiment.
Figure 8B:
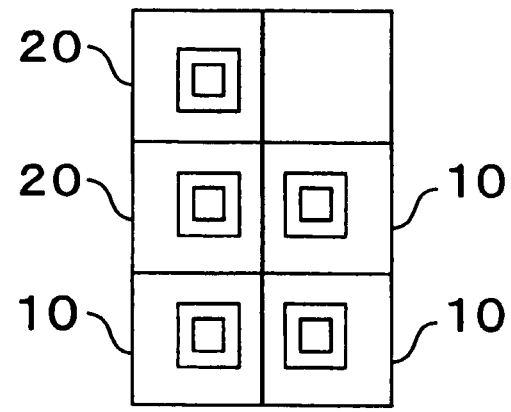
FIG. 8B is another example of integration of the transmitting element with the receiving elements, in which a part of the receiving elements is replaced with two transmitting elements with a two-by-two configuration of the receiving elements maintained, according to the sixth modification.

A configuration, in which the transmitting element 20 that can transmit the ultrasonic wave is arranged in addition to the receiving element 10, may be employed in the waveguide 33. FIGS. 8A, 8B show examples in which MEMS elements are employed. In the ultrasonic sensor 1, a part of the receiving elements 10, which are arranged in array, may be replaced with the transmitting element(s) 20. That is, the transmitting element 20 is integrated with the receiving element 10, so that both a transmitted signal and a received signal exist in the waveguide 33. The ultrasonic wave transmitted by the transmitting element 20 may be reflected by the reflecting surface 33a toward the detection object, for example. By using this configuration, the ultrasonic sensor 1 that transmits and receives the ultrasonic wave can be installed in the vehicle without spoiling its industrial design. Also, setting can be done in one operation by virtue of this integration. As well, misalignment of positions of the receiving element 10 and the transmitting element 20 is not caused. Furthermore, their arrangement in the central part of a waveguide horn leads to the same directivity in receiving and transmitting. Moreover, the elements can be produced at low cost. In a configuration shown in FIG. 8A, substrates can be used effectively. In a configuration shown in FIG. 8B, the two-by-two configuration of the receiving element 10 can be maintained. In addition, these arrangements may be done using elements other than the MEMS elements as well.

(Effects of Embodiment)

According to the ultrasonic sensor 1 of the present embodiment, the ultrasonic wave U, which is reflected by the obstruction M and enters through the first opening 33b into the waveguide 33, is reflected by the reflecting surface 33a in directions to the plurality of the receiving elements 10. Accordingly, the ultrasonic wave U is transmitted directly to each receiving element 10 through the medium of air without any other intermediary members, and thereby the damping of the ultrasonic wave can be reduced. As well, the damping of the ultrasonic wave U due to the multiple reflections and the like inside the waveguide 33 can be reduced as compared to the case where the reflecting surface 33a is not formed, so that the sensitivity of the ultrasonic sensor 1 can be improved.

Besides, the ultrasonic wave U reflected by the reflecting surface 33a is transmitted directly to the vibrating parts 16, and thereby the displacement of the vibrating part 16 can be made large. Thus, the detection signal by the receiving element 10 is made strong, thereby improving the sensitivity of the ultrasonic sensor 1.

Furthermore, the second opening 33c cannot be viewed from the first opening 33b. Accordingly, even when the foreign object such as a pebble, and a water droplet are blown toward the waveguide 33 and enter through the first opening 33b into the waveguide 33, for example, there is very little possibility for them to collide directly with the receiving element 10, and thus the receiving element 10 can be protected.

That is, the ultrasonic sensor 1, which receives the ultrasonic wave U effectively and in which the receiving element 10 is protected, can be realized.

By obtaining the time difference and the phase difference of the ultrasonic wave U received by the plurality of the receiving elements 10, not only the distance to the detection object but the position of the detection object can be measured based on each of the differences.

Moreover, the waveguide 33 is not necessary for each of the plurality of the receiving elements 10, and they can be brought together in one waveguide 33. Consequently, the waveguide 33 can be downsized, and thereby the ultrasonic sensor 1 can be downsized.

Figure 9:
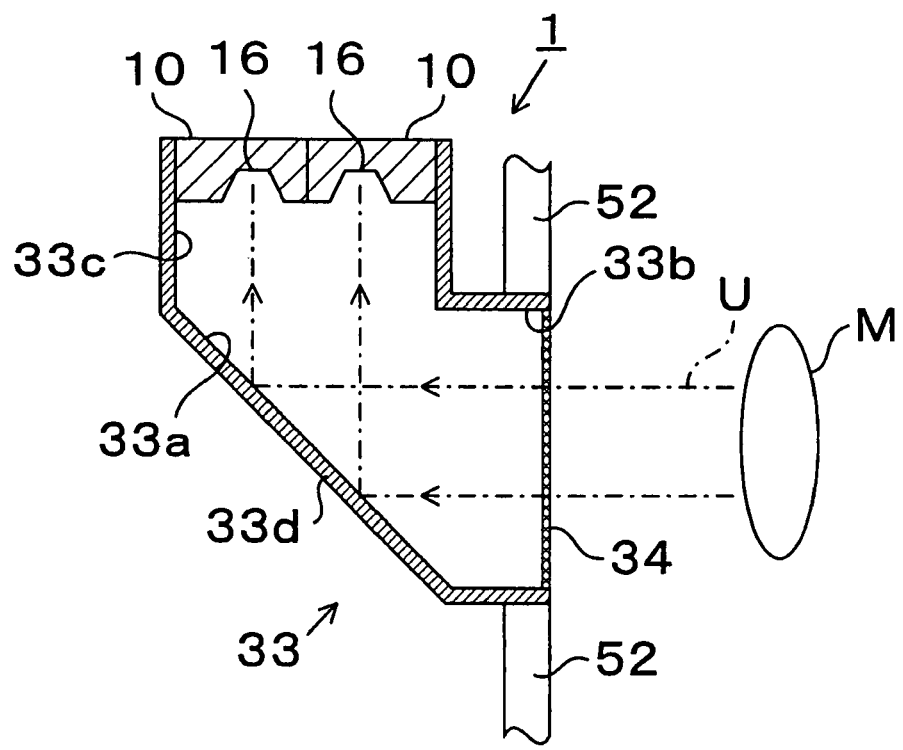
FIG. 9 is an illustrative longitudinal-sectional view of an ultrasonic sensor, in which a transmitting member that covers the first opening is provided according to another embodiment of the present invention.

Other Embodiments (1) FIG. 9 is an illustrative longitudinal-sectional view of the ultrasonic sensor 1, in which a transmitting member 34 that covers the first opening 33b is provided. As shown in FIG. 9, the transmitting member 34 may be formed by covering the first opening 33b with a material (e.g., a resin film with a thickness of approximately 1 [mm]), which can transmit the ultrasonic wave to the waveguide 33. By using this configuration, since the first opening 33b is covered with the transmitting member 34, there is very little possibility that a small foreign object or liquid such as a water droplet enters the waveguide 33. As a result, the receiving element 10 can be more reliably protected. The transmitting member 34 may be a material other than the resin film, as long as its material and size do not cause considerable damping of the ultrasonic wave. For example, metallic foil may be used.

(2) The ultrasonic sensor 1 may be disposed not only at the body 52 immediately below the bumper, but at various positions of the vehicle. The first opening 33b may be attached to, for example, a joint part of the body 52, a keyhole, or a marque. By using this configuration, the first opening 33b cannot be viewed easily from the outside of the vehicle. Thus, the vehicle with excellent industrial design can be produced.

The ultrasonic sensor 1 may be attached to other members as well, according to its usage. When the ultrasonic sensor 1 is used as the obstacle sensor on a lateral side of the vehicle, for example, the first opening 33b may be attached on a cover of a turning signal and the like.

Furthermore, the ultrasonic sensor 1 may be attached to a vehicle antenna. By using this configuration, the ultrasonic wave in all directions outside the vehicle can be received.

In addition, the ultrasonic sensor 1 may be attached to a cover of a headlamp, a rear lamp, or a back-up lamp.

(3) Since the ultrasonic sensor 1 can be used even under a severe environment in which it is raining or mud is dabbled, the ultrasonic sensor 1 can be suitably used by attaching it to those used in the open air, such as the vehicle. In addition to the vehicle, the ultrasonic sensor 1 may be attached to a robot used in the open air, for example.

Additional advantages and modifications will readily occur to those skilled in the art. The invention in its broader terms is therefore not limited to the specific details, representative apparatus, and illustrative examples shown and described.

What is claimed is:

1. An ultrasonic sensor comprising:
a plurality of vibrating parts, each of which vibrates when a corresponding ultrasonic wave, which is reflected by a detection object, is transmitted thereto, and thereby receives the corresponding ultrasonic wave;
a plurality of receiving elements, each of which includes corresponding one of the plurality of vibrating parts and detects the detection object based on the corresponding ultrasonic wave; and
a waveguide, which holds the plurality of receiving elements and is formed such that the corresponding ultrasonic wave is transmitted through the waveguide to each of the plurality of receiving elements, wherein the waveguide includes:
a first opening that faces the detection object, wherein the corresponding ultrasonic wave reflected by the detection object enters through the first opening into the waveguide;
a second opening that is not viewable from the first opening, wherein the plurality of receiving elements is held by the second opening of the waveguide such that each of the plurality of vibrating parts is arranged to face a direction in which the each of the plurality of vibrating parts receives the corresponding ultrasonic wave; and
a reflecting surface for reflecting the corresponding ultrasonic wave, which enters through the first opening of the waveguide, in a direction to the each of the plurality of vibrating parts, wherein
an absorbing member is formed on an inner wall surface of the waveguide except the reflecting surface, the absorbing member comprising a material having a higher absorption coefficient of the corresponding ultrasonic wave than the reflecting surface.

2. The ultrasonic sensor according to claim 1, wherein the first opening and the each of the plurality of vibrating parts are arranged relative to the reflecting surface, such that the corresponding ultrasonic wave, which enters through the first opening, is directly reflected by the reflecting surface and then transmitted directly to the each of the plurality of vibrating parts.

3. The ultrasonic sensor according to claim 1, wherein a reflecting member is formed on the reflecting surface and the reflecting member is made of a material, which has a higher reflectivity of the corresponding ultrasonic wave than an inner wall surface of the waveguide.

4. The ultrasonic sensor according to claim 1, wherein the first opening is formed such that a cross-sectional area of the first opening increases as the first opening extends from a predetermined position inside the waveguide toward an end part of the first opening, which faces the detection object.

5. The ultrasonic sensor according to claim 1, wherein the first opening is formed such that a cross-sectional area of the first opening decreases as the first opening extends from a predetermined position inside the waveguide toward an end part of the first opening, which faces the detection object.

6. The ultrasonic sensor according to claim 1, wherein the first opening is covered with a transmitting member, which prevents a foreign object from entering through the first opening into the waveguide and transmits the corresponding ultrasonic wave to the waveguide.

7. The ultrasonic sensor according to claim 1, further comprising a transmitting element, which is disposed inside the waveguide, wherein
the transmitting element transmits an ultrasonic wave to the detection object.

8. The ultrasonic sensor according to claim 1, wherein the ultrasonic sensor is attached to an object that is used outdoors.

9. The ultrasonic sensor according to claim 8, wherein the object is one of a vehicle and a robot.

10. The ultrasonic sensor according to claim 1, wherein the absorbing member is made of an elastic material.

11. The ultrasonic sensor according to claim 10, wherein the elastic material is one of a sponge material, rubber and resin.

12. The ultrasonic sensor according to claim 1, wherein the material of the absorbing member has the absorption coefficient which is equal to or larger than 70%.

13. An ultrasonic sensor comprising:
a plurality of vibrating parts, each of which vibrates when a corresponding ultrasonic wave, which is reflected by a detection object, is transmitted thereto, and thereby receives the corresponding ultrasonic wave;
a plurality of receiving elements, each of which includes corresponding one of the plurality of vibrating parts and detects the detection object based on the corresponding ultrasonic wave; and
a waveguide, which holds the plurality of receiving elements and is formed such that the corresponding ultrasonic wave is transmitted through the waveguide to each of the plurality of receiving elements, wherein
the waveguide includes:
    a first opening that faces the detection object, wherein the corresponding ultrasonic wave reflected by the detection object enters through the first opening into the waveguide;
    a second opening that is not viewable from the first opening, wherein the plurality of receiving elements is held by the second opening of the waveguide such that each of the plurality of vibrating parts is arranged to face a direction in which the each of the plurality of vibrating parts receives the corresponding ultrasonic wave; and
    a reflecting surface for reflecting the corresponding ultrasonic wave, which enters through the first opening of the waveguide, in a direction to the each of the plurality of vibrating parts, wherein
    the first opening is formed such that a cross-sectional area of the first opening decreases as the first opening extends from a predetermined position inside the waveguide toward an end part of the first opening, which faces the detection object.

* * * * *